(12) United States Patent
Laporte et al.

(10) Patent No.: US 12,358,199 B2
(45) Date of Patent: *Jul. 15, 2025

(54) APPARATUS AND METHODS FOR MANUFACTURING BIODEGRADABLE, COMPOSTABLE, DRINK STRAWS FROM POLYHYDROXYALKANOATE MATERIAL

(71) Applicant: New WinCup Holdings, Inc., Stone Mountain, GA (US)

(72) Inventors: Bradley Keith Laporte, Newnan, GA (US); Paul Daniel George, Jr., Jacksonville, FL (US); William Lloyd Prickett, Buford, GA (US); Billy Poindexter, II, Newnan, GA (US)

(73) Assignee: New WinCup Holdings, Inc., Stone Mountain, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/626,167

(22) Filed: Apr. 3, 2024

(65) Prior Publication Data

US 2024/0245243 A1 Jul. 25, 2024

Related U.S. Application Data

(63) Continuation of application No. 16/879,479, filed on May 20, 2020, now Pat. No. 11,974,683.

(Continued)

(51) Int. Cl.
*B29C 48/09* (2019.01)
*A47G 21/18* (2006.01)
(Continued)

(52) U.S. Cl.
CPC .............. *B29C 48/09* (2019.02); *A47G 21/18* (2013.01); *A47G 21/181* (2013.01);
(Continued)

(58) Field of Classification Search
CPC . B29C 48/09; B29C 48/0018; B29C 48/0022; B29C 48/022; B29C 48/03;
(Continued)

(56) References Cited

U.S. PATENT DOCUMENTS

| 3,169,272 | A | | 2/1965 | Maxson |
| 3,184,791 | A | * | 5/1965 | Gamble ................ B29C 48/908 425/71 |

(Continued)

FOREIGN PATENT DOCUMENTS

| JP | 2005350350 A | 12/2005 |
| JP | 2005350530 A | 12/2005 |

(Continued)

*Primary Examiner* — Jeffrey M Wollschlager
(74) *Attorney, Agent, or Firm* — Condo Roccia Koptiw LLP

(57) ABSTRACT

Apparatus and methods for manufacturing compostable, biodegradable drink straws from polyhydroxyalkanoate (PHA) material are disclosed herein. Such apparatus may include a hopper that contains raw PHA material, an extruder that receives the raw PHA material from the hopper and produces extruded PHA material, one or more waters baths that cool the extruded PHA material, a puller that pulls a tubular stream of PHA material through the system, and a cutter that is configured to cut the stream of PHA material into finished straws. The finished straws may be soil- and marine-biodegradable, as well as home- and industrial-compostable.

16 Claims, 10 Drawing Sheets

Related U.S. Application Data

(60) Provisional application No. 62/850,520, filed on May 20, 2019.

(51) Int. Cl.

| | | |
|---|---|---|
| *B29C 48/00* | (2019.01) | |
| *B29C 48/03* | (2019.01) | |
| *B29C 48/285* | (2019.01) | |
| *B29C 48/32* | (2019.01) | |
| *B29C 48/395* | (2019.01) | |
| *B29C 48/68* | (2019.01) | |
| *B29C 48/80* | (2019.01) | |
| *B29C 48/88* | (2019.01) | |
| *B29C 48/90* | (2019.01) | |
| *B29C 48/92* | (2019.01) | |
| *B29K 67/00* | (2006.01) | |
| *B29L 23/00* | (2006.01) | |
| *C08L 67/04* | (2006.01) | |

(52) U.S. Cl.
CPC ...... *B29C 48/0018* (2019.02); *B29C 48/0022* (2019.02); *B29C 48/022* (2019.02); *B29C 48/03* (2019.02); *B29C 48/288* (2019.02); *B29C 48/32* (2019.02); *B29C 48/397* (2019.02); *B29C 48/681* (2019.02); *B29C 48/832* (2019.02); *B29C 48/903* (2019.02); *B29C 48/905* (2019.02); *B29C 48/919* (2019.02); *B29C 48/92* (2019.02); *C08L 67/04* (2013.01); *B29C 2948/92704* (2019.02); *B29C 2948/92895* (2019.02); *B29K 2067/04* (2013.01); *B29K 2867/00* (2013.01); *B29K 2867/04* (2013.01); *B29K 2995/006* (2013.01); *B29L 2023/008* (2013.01); *C08L 2201/06* (2013.01)

(58) Field of Classification Search
CPC ..... B29C 48/288; B29C 48/32; B29C 48/397; B29C 48/681; B29C 48/832; B29C 48/905; B29C 48/919; B29C 48/92; B29C 2948/92704; B29C 2948/92895; B29C 48/355; B29C 48/88; B29C 48/90; B29C 48/901; B29C 48/092; B29C 48/903; B29C 48/907; B29C 48/908; B29C 48/911; B29C 48/9115; A47G 21/18; A47G 21/181; C08L 67/04; C08L 2201/06; B29K 2067/04; B29K 2867/00; B29K 2867/04; B29K 2995/006; B29L 2023/008

See application file for complete search history.

(56) References Cited

U.S. PATENT DOCUMENTS

| | | | | |
|---|---|---|---|---|
| 3,922,328 | A * | 11/1975 | Johnson | ............... B29C 48/919 425/141 |
| 3,993,726 | A * | 11/1976 | Moyer | ................. B29B 15/122 264/171.12 |
| 4,068,615 | A * | 1/1978 | LeNir | ..................... B29C 48/92 118/DIG. 22 |
| 4,548,778 | A | 10/1985 | Fujii | |
| 4,575,326 | A | 3/1986 | French | |
| 4,750,873 | A | 6/1988 | Loe et al. | |
| 5,226,998 | A | 7/1993 | Few | |
| 6,257,863 | B1 | 7/2001 | Otte | |
| 6,461,468 | B1 | 10/2002 | Cohen | |
| 6,620,354 | B1 | 9/2003 | Bessemer et al. | |
| 9,868,241 | B1 | 1/2018 | Coulson | |
| 12,221,538 | B2 * | 2/2025 | Okura | ..................... A47G 21/18 |
| 2002/0084012 | A1 | 7/2002 | Solar et al. | |
| 2002/0162619 | A1 | 11/2002 | Shibuya et al. | |
| 2003/0206990 | A1 | 11/2003 | Edmondson et al. | |
| 2003/0217648 | A1 | 11/2003 | Noda et al. | |
| 2005/0008806 | A1 | 1/2005 | Schewe et al. | |
| 2007/0182041 | A1 | 8/2007 | Rizk et al. | |
| 2012/0013037 | A1 | 1/2012 | Riebel et al. | |
| 2016/0009912 | A1 | 1/2016 | Wang et al. | |
| 2016/0089846 | A1 | 3/2016 | Mccartney et al. | |
| 2017/0157824 | A1 | 6/2017 | Ward et al. | |
| 2018/0339129 | A1 | 11/2018 | Ganatra et al. | |
| 2021/0301127 | A1 | 9/2021 | Okura | |

FOREIGN PATENT DOCUMENTS

| | | |
|---|---|---|
| JP | 2006136657 A | 6/2006 |
| WO | 0037119 A1 | 6/2000 |

* cited by examiner

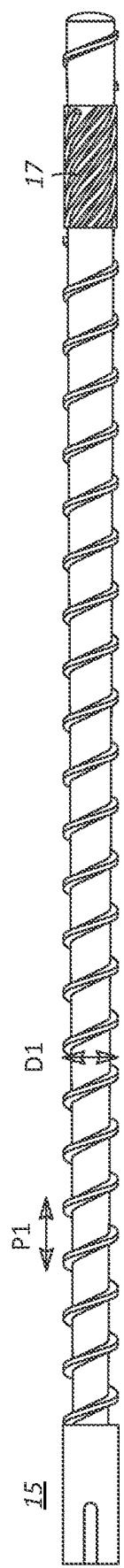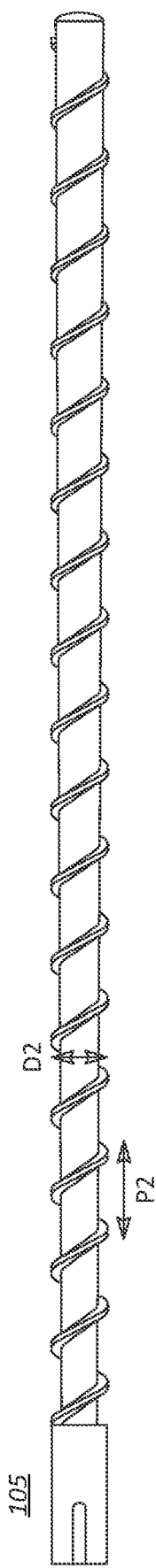
FIG. 2A
FIG. 2B

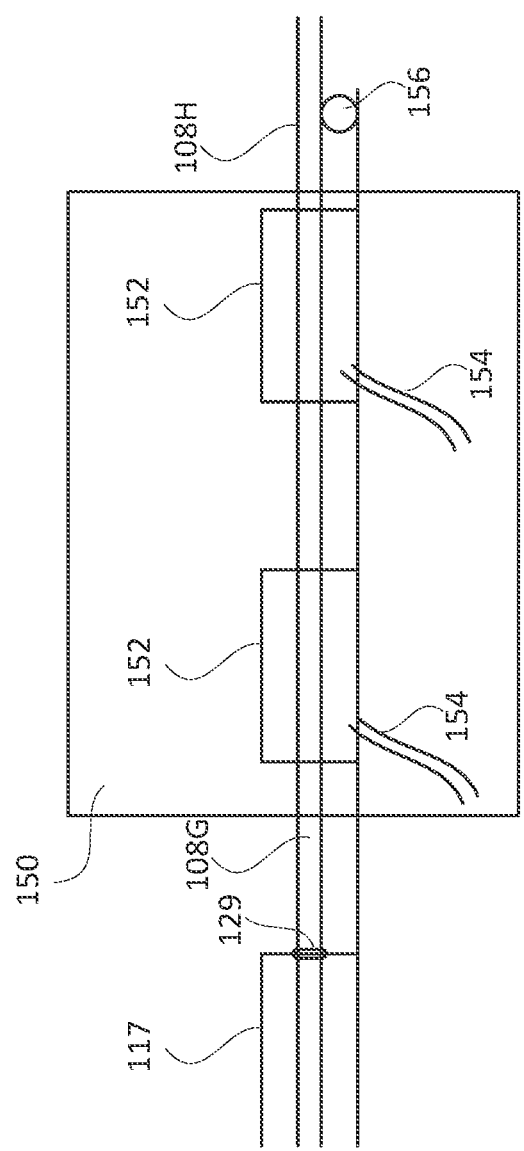
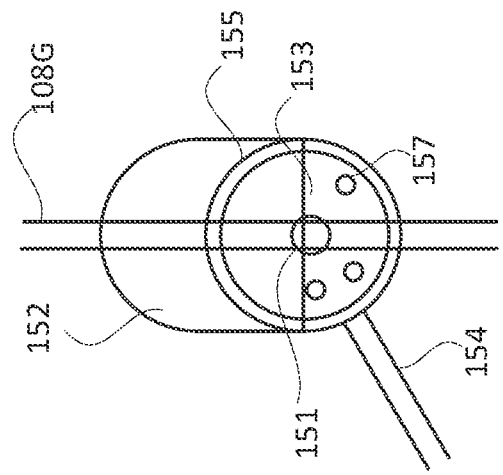
FIG. 5A
FIG. 5B

APPARATUS AND METHODS FOR MANUFACTURING BIODEGRADABLE, COMPOSTABLE, DRINK STRAWS FROM POLYHYDROXYALKANOATE MATERIAL

CROSS-REFERENCE TO RELATED APPLICATIONS

This application is a continuation of U.S. patent application Ser. No. 16/879,479, filed May 20, 2020, which claims benefit of provisional U.S. patent application No. 62/850,520, filed on May 20, 2019, the disclosures of each of which are incorporated herein by reference.

BACKGROUND

Traditional drink straws may be made of a plastic or thermoplastic polymer material, such as polypropylene, for example. Typically, such materials, and consequently, straws made of such materials, are usually neither biodegradable nor compostable.

Efforts are being made to produce straws that are soil-biodegradable, marine-biodegradable, home-compostable, and industrial-compostable. A challenge has been to produce a biodegradable and compostable straw that also has thermoplastic and mechanical properties that are acceptable for consumer use.

Polyhydroxyalkanoate (PHA) is an example of a material that has better compostable and biodegradable properties than other polymer materials from which straws are typically made. However, there have been challenges associated with processing PHA material into straws, as the PHA material has thermoplastic and mechanical properties that are different from those of the polymer materials that are typically used to produce straws. Thus, there is a need in the art for apparatus and methods for manufacturing compostable, biodegradable straws from PHA material.

SUMMARY

Apparatus and methods for manufacturing drink straws from polyhydroxyalkanoate (PHA) material are disclosed herein. An example of such apparatus may include a hopper that contains raw PHA material, and an extruder that receives the raw PHA material from the hopper and produces extruded PHA material.

Molten PHA material may be provided from the extruder through an extruder die. The extruder die may be configured to produce a stream of extruded PHA material that has a tubular shape. The extruder die may include a pin that at least partially defines a material channel within the extruder die. The molten PHA material is channeled through the material channel. An end portion of the material channel corresponds to a desired material thickness of the stream of extruded PHA material. The pin may also define an air channel along a longitudinal axis thereof. Compressed air may be provided via the air channel into a hollow portion of the stream of extruded PHA material as it exits the die.

The extruded PHA material may be pulled through one or more water baths. The system may include a puller configured to pull the PHA material out of the extruder die and through the water baths. Such a puller may include one or more puller belts composed of a material that enables the puller belt to grip and pull a stream of cooled PHA material. The stream of cooled PHA material may contain at least 50% PHA and have a tubular shape. To avoid crushing the PHA material, the puller belts may be composed of a material having a durometer of between about 30 and about 55.

One of the water baths may be a pre-sizing water bath that is configured to receive the extruded PHA material from the extruder, to cause the extruded PHA material to begin to crystallize to form crystalizing PHA material, and to provide the crystalizing PHA via a sizing tube to a second water bath. The pre-sizing water bath may contain water having a temperature of between about 120° F. and about 145° F., while the extruded PHA material may have a temperature of about 300° F. to about 330° F. The sizing tube may be configured to form the crystallizing PHA material into a stream of PHA material having a tubular shape that is suitable for being cut to size to form PHA drink straws.

A drink straw produced by such an apparatus may have a tubular body that is made of a PHA material. Such a straw may be marine-biodegradable, soil-biodegradable, home-compostable, and industrial-compostable. For example, such a straw may degrade by as much as 80% in a marine environment within one to two years. Testing has shown that such straws may degrade by as much as 88% in a marine environment in as few as 97 days.

BRIEF DESCRIPTION OF THE DRAWINGS

FIG. 2A depicts a typical extruder screw for use in manufacturing prior art drink straws. FIG. 2B depicts an example extruder screw for use in manufacturing PHA drink straws in accordance with the methods disclosed herein.

FIGS. 5A and 5B depict an example water removal system for use in manufacturing PHA drink straws in accordance with the methods disclosed herein.

DETAILED DESCRIPTION

Figure 1:
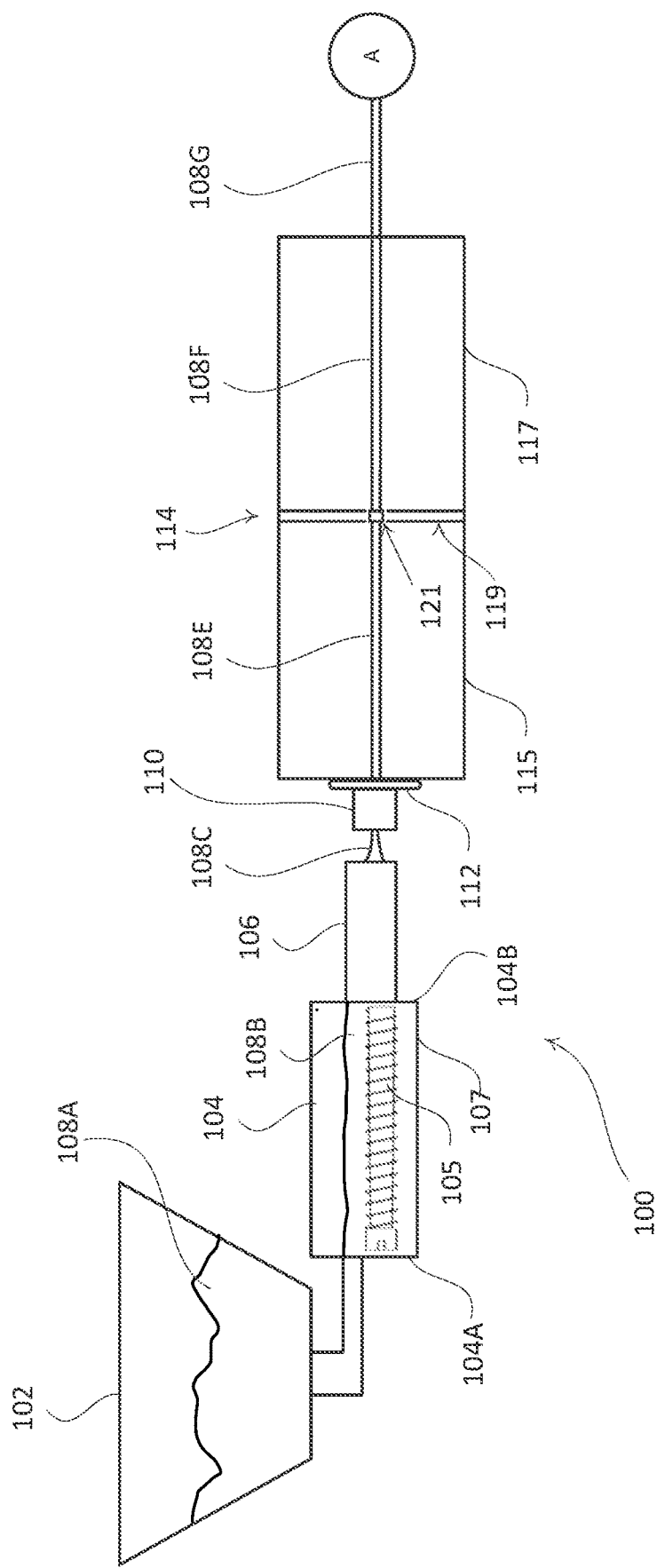
FIG. 1 is a system diagram illustrating example apparatus and methods as disclosed herein for manufacturing PHA straws.
Figure 1:
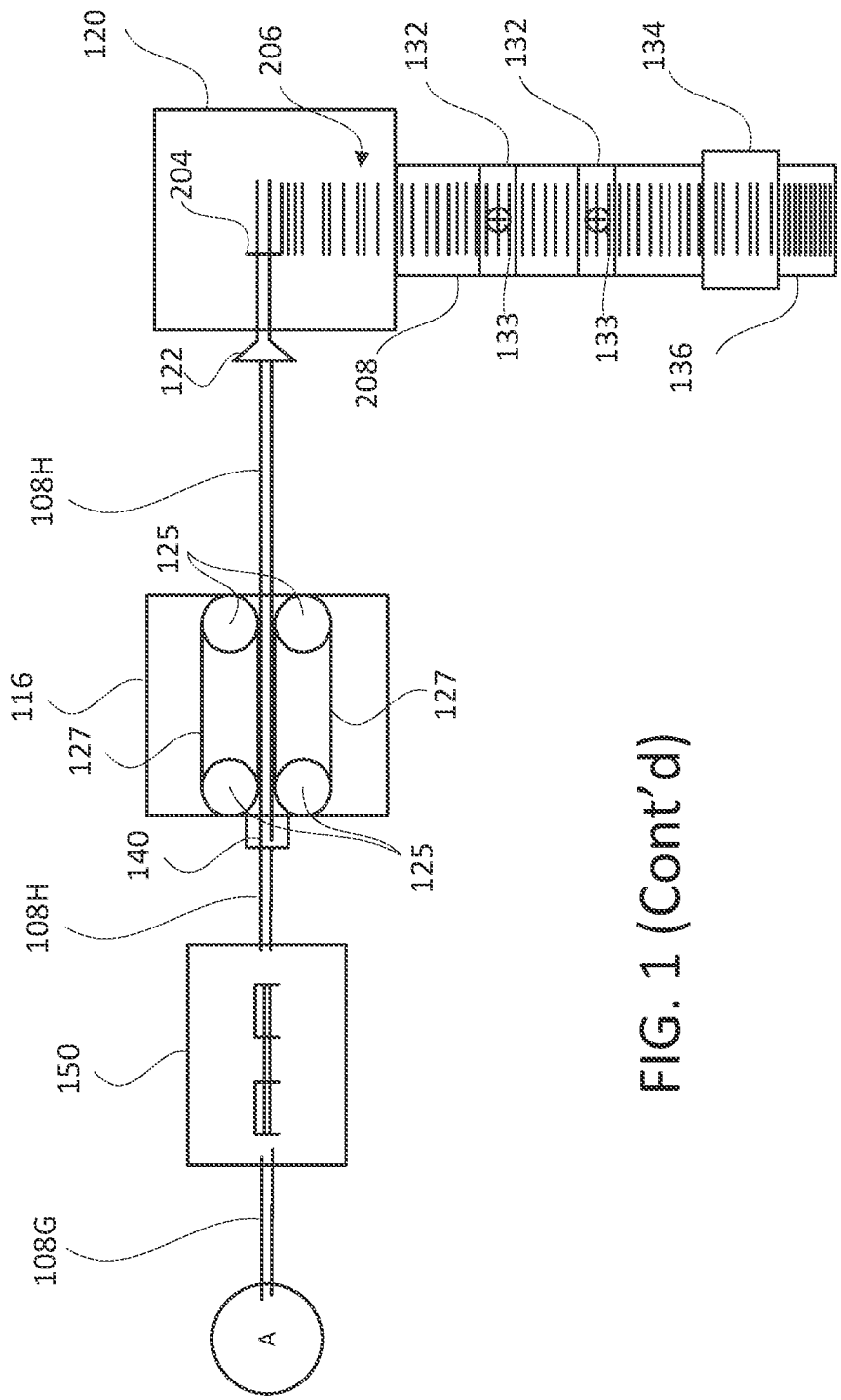

FIG. 1 is a system diagram illustrating an example system 100 for manufacturing drink straws from polyhydroxyalkanoate (PHA) materials. As shown in FIG. 1, the system 100 may include a hopper 102. The hopper 102 may receive raw PHA material 108A. As used herein, the term PHA material refers to any material that is made of at least 30% PHA by weight. Accordingly, the raw PHA material 108A may be a raw material that contains at least 30% PHA, preferably at least 50% PHA, and more preferably about 80-85% PHA. The raw PHA material 108 may be provided to the hopper in pellet form. Thus, the raw PHA material 108A may include pellets that are made of a material that contains at least 30% PHA, i.e., PHA pellets. The hopper 102 may also receive color additives for changing the color of the raw materials. The color additives may be mixed into the raw PHA material 108A.

The raw PHA material 108A may be transferred from the hopper 102 to an extruder 104. The extruder 104 may melt the raw PHA material 108A to form molten PHA material 108B. That is, the PHA pellets may be transferred to the extruder 104, where the PHA pellets may be melted to form a fluid. The extruder 104 may be a screw-and-barrel extruder. A screw-and-barrel extruder may have an auditor compression-type screw 105 inside a cylindrical barrel 107. The extruder screw 105 may push the molten PHA material 108B through the cylindrical extruder barrel 107. The extruder screw 105 may draw the raw PHA material 108A from the hopper 102 and meter the molten PHA material 108B toward a die 106.

To melt the raw PHA material 108A, the extruder 104 may be configured to have a temperature profile. That is, the extruder 104 may be configured such that the temperature within the extruder is lower at the end 104A of the extruder 104 that receives the raw PHA material 108A from the hopper 102, than it is at the end 104B of the extruder 104 that provides the molten PHA material 108B to the die 106. In other words, the temperature within the extruder barrel 107 may increase from one end 104A of the extruder 104 to the other end 104B.

For example, the temperature profile of the extruder 104 may range from about 290° F. at the end 104A of the extruder 104 that receives the raw PHA material 108A from the hopper 102, to about 390° F. at the end 104B of the extruder 104 that provides the molten PHA material 108B to the die 106. The temperature at the end 104A of the extruder 104 may be between about 290° F. and 340° F. The temperature at the end 104B of the extruder 104 may be between about 340° F. and 390° F. The length of the extruder 104 in the direction along which the molten PHA material 108B is being pushed may be about 90 to about 145 inches.

Before using the extruder 104 for manufacturing PHA drink straws in accordance with the methods disclosed herein, it may be desirable to purge the extruder 104. That is, it may be desirable to remove any raw materials that might have been used in a previous straw-making process in order to prepare the extruder 104 for use with PHA material. For example, an extruder that is to be used to manufacture PHA drink straws may have been used previously for extruding a different material, such as a polypropylene material, for example. In such event, any residual polypropylene material may be purged from the extruder 104 using a chemical, such as an ethylene (e.g., polyethylene). Purging the extruder as such allows for bridging the transition from a first temperature profile used for melting and extruding a first material, such as a polypropylene-based material, for example, to a second temperature profile used for melting and extruding a second material, such as a PHA-based material, for example. Such a purging process enables clean use of PHA material for making drink straws.

FIGS. 2A and 2B depict example extruder screws. FIG. 2A depicts a typical high-shear, high-volume, mixing screw 15 that might be commonly used in manufacturing prior art drink straws from polymer materials that are not PHA materials. Polypropylene is an example of such a material. FIG. 2B depicts an example low-shear, low-volume, non-mixing screw 105 that has been developed for use in manufacturing PHA drink straws in accordance with the methods disclosed herein. Such a low-shear, low-volume, non-mixing screw is desirable to prevent overworking the PHA material in the extruder 104.

As shown, screw 15 includes a mixing section 17. Screw 105 has no such mixing section. Also, the thread pitch P2 of screw 105 is greater than the thread pitch P1 of screw 15, and the crest-to-crest diameter D2 of screw 105 is smaller than the crest-to-crest diameter D1 of screw 15. The greater thread pitch P2 and smaller crest-to-crest diameter D2 of screw 105 conspire to reduce the amount of shear within the extruder 104. The greater thread pitch P2 and smaller crest-to-crest diameter D2 also conspire to reduce the flow rate of the molten material 108B through the extruder 104. The flow rate at which the molten material 108B is pushed through the extruder 104 is reduced by reducing the volume of molten material 108B produced in the extruder 104 in a given amount of time.

As mentioned above, the extruder screw 105 pushes the molten PHA material 1086 through a die 106. The die 106 may receive the molten PHA material 1086 from the extruder 104 and form the molten PHA material 108B into a tube.

Figure 3:
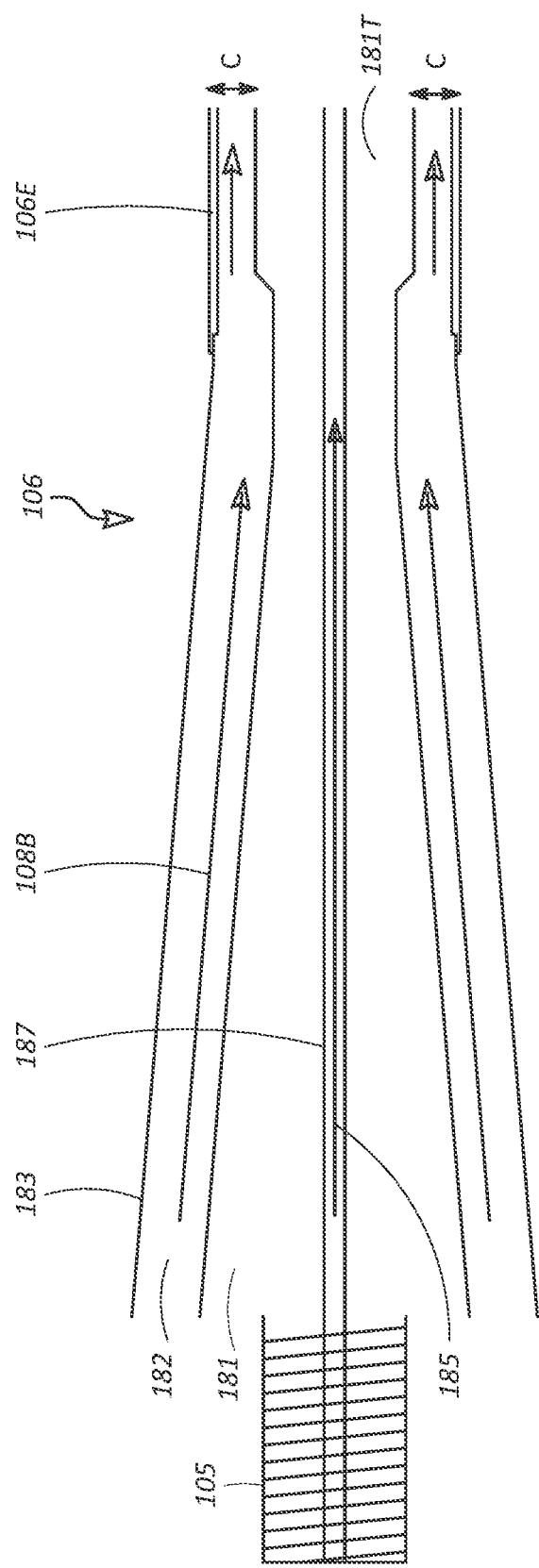
FIG. 3 depicts an example extrusion die for use in manufacturing PHA drink straws in accordance with the methods disclosed herein.

FIG. 3 is a cross-sectional view of an example extrusion die 106 for use in manufacturing PHA drink straws in accordance with the methods disclosed herein. As shown, an end portion 106E of the die 106 may be generally tubular in shape. The die 106 may have a body portion 183 and a pin 181. The pin 181 may be disposed within a bore defined by the body portion 183. A material channel 182 may be defined between the pin 181 and the body portion 183. The molten PHA material 108B may be received into the material channel 182 and pushed through the die by the extruder screw 105.

At the end 106E of the die 106 opposite the extruder 104 (i.e., where the extruded PHA material 108C exits the die 106), the material channel 182 may be defined by the inner surface of the body portion 183 and the tip 181T of the pin 181. For manufacturing a PHA straw having an inner diameter of about 200 mils, the clearance, C, between the outer surface of the pin tip 181T and the inner surface of the body portion 183 at the end 106E of the material channel 182 may be about 104 mils. The inner diameter of the body portion 183 may be about 734 mils, while the outer diameter of the pin tip 181T may be about 630 mils. Thus, the "draw down" from the outer diameter of the pin tip 181T to the inner diameter of the straw would be about 430 mils. In another example, for manufacturing a PHA straw having an inner diameter of about 98 mils, the clearance, C, between the outer surface of the pin tip 181T and the inner surface of the body portion 183 at the end 106E of the material channel 182 may be about 90 mils. The inner diameter of the body portion 183 may be about 535 mils, while the outer diameter of the pin tip 181T may be about 445 mils. Thus, the "draw down" from the outer diameter of the pin tip 181T to the inner diameter of the straw would be about 347 mils.

The die 106 may also include an air channel 187 that runs along the longitudinal axis of the die 106. Compressed air 185 may be forced down the air channel 187 from an air compressor (not shown) and into the center portion of the extruded PHA material 108C as it exits the die 106 to help the extruded PHA material 108C maintain its tubular shape.

The extruded PHA material 108C may be pulled from the die 106 by a puller 116. The extruded PHA material 108C may be pulled through a two-stage water bath 114 after having been fed through a sizing ring 112. Additionally, the extruded PHA material 108C may be pulled through a pre-sizing water bath 110 prior to being fed through the sizing ring 112.

Figure 4:
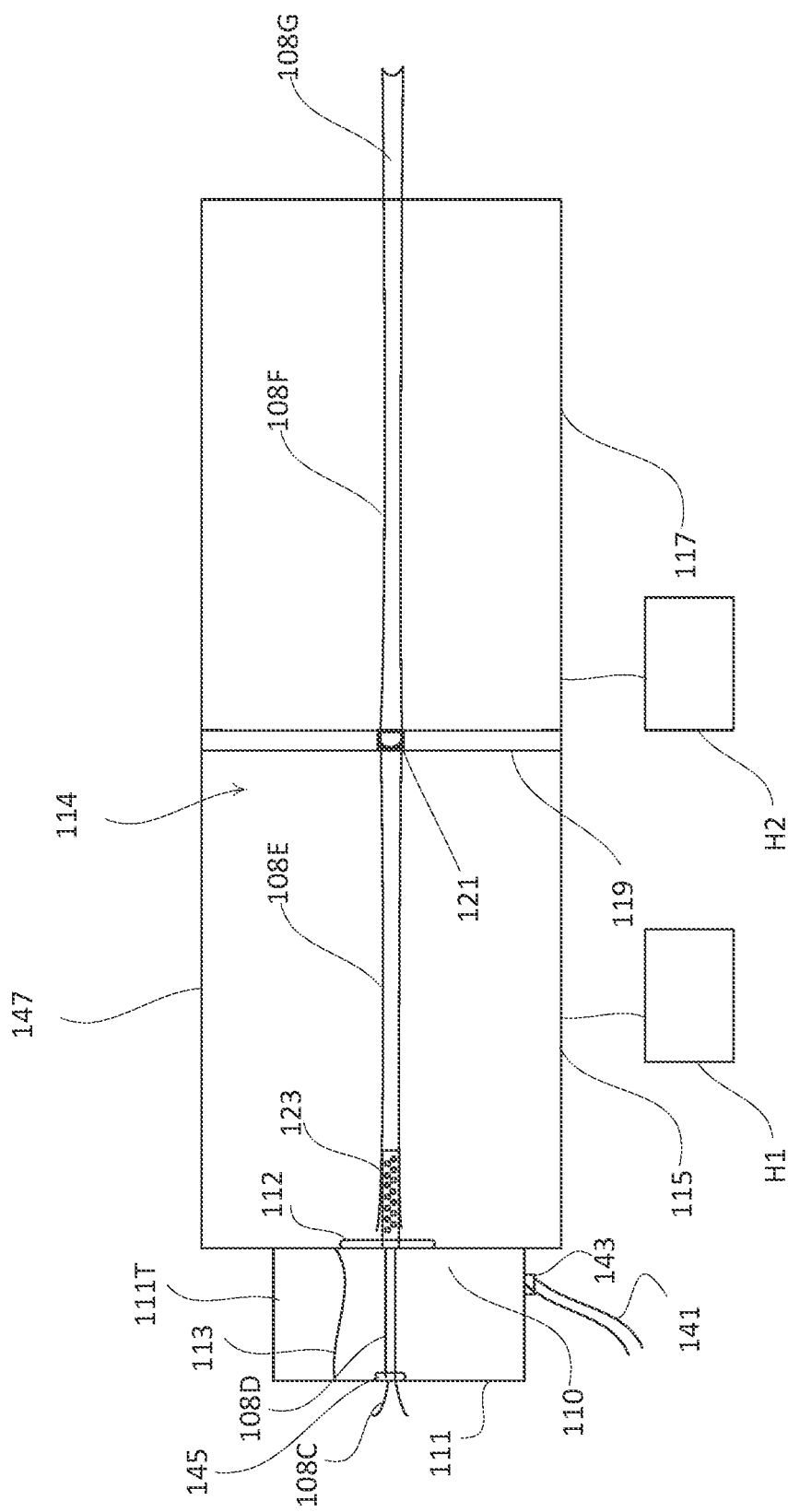
FIG. 4 depicts an example pre-sizing water bath and an example two-stage water bath for use in manufacturing PHA drink straws in accordance with the methods disclosed herein.

FIG. 4 depicts an example pre-sizing water bath 110 for use in manufacturing PHA drink straws in accordance with the methods disclosed herein. The pre-sizing water bath 110 may include a water containment tank 111. The top 111T of the tank 111 may be open or closed.

The water 113 contained in the pre-sizing water bath 110 may have a depth that is sufficient to cover the PHA material 108D that is being pulled through the water bath 110. For example, the water 113 contained in the pre-sizing water bath 110 may have a depth that is at least the diameter of the extruded PHA material 108C. Consequently, the pre-sizing water bath 110 may have a height that is at least the diameter of the extruded PHA material 108C. The length of the pre-sizing water bath 110 (i.e., in the direction along which the extruded PHA material 108C is being pulled) may be at least about 4 inches, preferably within a range of about 4 to 5 inches.

The pre-sizing water bath 110 may be a hot water bath. That is, the pre-sizing water bath 110 may contain water that has been heated to a temperature that is greater than about 125° F. For example, the pre-sizing water bath 110 may contain water at a temperature that is within a range of about 125° F. to about 150° F. Preferably, the temperature of the water contained in the pre-sizing water bath 110 is within a range of about 125° F. to 135° F.

As described above, the end 104B of the extruder 104 from which the molten PHA material 108B is provided to the die 106 may be at a temperature of about 355° F. A threshold temperature for crystallization of the extruded PHA material 108C may be in the range of 125° F. to 135° F. Consequently, it may be desirable for the water contained in the pre-sizing water bath 110 to have a minimum temperature of at least about 125° F. to 135° F. The change in temperature from the 355° F. at the die-end 104B of the extruder 104, to the 125-135° F. water bath 110, may shock the extruded PHA material 108C into beginning a crystallization process. This change in temperatures may speed up the crystallization process by changing the rate of crystallization of the extruded PHA material 108C. The tank of the pre-sizing water bath 110 may be a non-vacuum container (e.g., open at the top) to allow for the extruded PHA material 108C to begin to crystallize without being affected by a vacuum-sealed environment.

The rate of crystallization of the crystallizing PHA material 108D in the pre-sizing water bath 110 was tested as follows. Extruded PHA material 108C was forced out of the extruder 104, the die-end 104B of which was at a temperature of about 355° F., and pulled into the pre-sizing water bath 110. Tests were conducted with the temperature of the water contained in the pre-sizing water bath 110 at various temperatures from about 60° F. up to about 135° F. Initial tests were conducted with the water contained in the pre-sizing water bath 110 having a temperature at about 60° F., as it was hypothesized that the initial temperature change to cooler temperatures would trigger a faster change in the crystallization rate of the extruded PHA material 108C. However, the faster changes in crystallization rate desired for the process were triggered when the water contained in the pre-sizing water bath 110 was at a temperature in the range of about 125° F. to 135° F. Thus, it was observed that the extruded PHA material 108C crystalizes faster when surrounded by hotter water temperatures in the water bath 110. The faster crystallization causes the crystallizing PHA material 108D to become harder faster to allow for the PHA material to be processed more quickly through the straw making process. Consequently, the crystallizing PHA material 108D may enter into the sizing ring 112 and/or a sizing tube (described below) with a greater tensile strength for processing due to the crystallization being triggered by the temperature of the pre-sizing water bath 110.

Thus, extruded PHA material 108C may be lubricated and/or crystalized as it is pulled through the pre-sizing water bath 110. Being pulled through the water bath 110 may strengthen the PHA material for being pulled by the puller 116 and/or through the sizing ring 112. The PHA material being lubricated and/or crystalized may give the PHA material the physical characteristics to be pulled through the sizing ring 112 without breaking or becoming inconsistent.

As mentioned above, the extruded PHA material 108C may be pulled from the die 106 and eventually through a sizing ring 112 by a puller 116. The sizing ring 112 may be circular in shape and may have an opening that corresponds to a diameter of the straw being manufactured from the PHA material. It has been discovered that the PHA material may be too soft to be fed through traditional baffles that are typically used when making drink straws from other materials, such as polypropylene, for example.

As shown in FIG. 1, and in detail in FIG. 4, the extruded PHA material 108O may be pulled through a two-stage water bath 114 after having been fed through the sizing ring 112. The two-stage water bath 114 may include a vacuum-sealed tank or housing 147. The sizing ring 112 may be external to the two-stage water bath 114, as shown in FIG. 1, or internal to the tank 147, as shown in FIG. 4.

A sizing tube 123 may be connected to the sizing ring 112. The sizing tube 123 may extend a distance from the sizing ring 112 into the water bath 114. For example, the sizing tube 123 may extend about three to five inches into the water bath 114. The sizing tube 123 may be configured to control the diameter and wall thickness of the straw. For example, the sizing tube 123 may define a bore that extends longitudinally therethrough. The bore may have a diameter that corresponds to the diameter of the straw being manufactured. That is, the sizing tube may have an inner diameter that corresponds to the outer diameter of the straw being manufactured. The sizing tube may have an inner diameter that is about 40% bigger than the desired outer diameter of the straw. For example, if the desired outer diameter of the finished straw product is about 286 mils, the inner diameter of the sizing tube may be about 396 mils. The outer diameter of the sizing tube may be about 492 mils. Due to differences in material characteristics, the sizing tube 123 may be about twenty-five thousandths of an inch larger than a comparable sizing tube that may be used for making straws of other material (e.g., polypropylene) to obtain a proper straw diameter.

The sizing tube 123 may define a plurality of holes through the outer surface thereof. Water may be pulled through the holes by the vacuum in the tank to lubricate and cool the PHA material 108E as it is being pulled into the two-stage water bath 114. The straws may be defined at half-inch intervals along the tubular walls of the sizing ring. The size of the sizing tube 123, and the configuration of the holes, affects the amount of water that is pulled into the interior of the sizing ring. This, for its part, controls the material thickness of the PHA material 108E being pulled through the sizing tube 123.

As shown in FIG. 4, the two-stage water bath 114 may include a housing 147. A wall 119 may be disposed within the housing 147. The wall 119 and the housing 147 may cooperate to define a first chamber 115 within the housing and a second chamber 117 within the housing. Thus, the wall may be disposed between the first chamber 115 and the second chamber 117, and thereby separate the first chamber 115 and the second chamber 117. The first chamber 115 may be configured to receive extruded PHA material 108C from the extruder or crystallizing PHA material 108D from the pre-sizing water bath 110. The first chamber 115 may be a relatively warm-water bath that contains water having a first temperature. The second chamber 117 may be a relatively cool-water bath that contains water having a second temperature that is lower than the first temperature. The second chamber 117 may be configured to receive first cooled PHA material 108E from the first chamber and to produce second cooled PHA material 108F.

The water in the first chamber 115 of the water bath 114 may be at the same or a similar temperature as the water bath 110. For example, the water in the first chamber 115 of the water bath 114 may be kept at a temperature within a range of about 125° F. to about 175° F. In another example, the water in the first chamber 115 of the water bath 114 may be kept at a temperature within a range of about 130° F. to 140° F., or within a range of about 135° F. to 145° F. As an example, the water in the first chamber 115 of the water bath 114 may be kept at a temperature of about 140° F. The first chamber 115 of the water bath 114 may be about 7 to 10 feet long. A first temperature control system H1 may be provided to maintain the desired temperature of the water in the first chamber 115. For example, the first temperature control system H1 may be a heater, as the desired temperature of the water in the first chamber 115 will typically be above room temperature.

The water in the second chamber 117 of the water bath 114 may be kept at a temperature within 70° F. to 90° F. The water in the second chamber 117 of the water bath 114 may cool the PHA material 108F over a period of time to solidify the PHA material 108F and/or strengthen the PHA material 108F. The water in the second chamber 117 of the water bath 114 may cool the PHA material 108F to solidify the PHA material 108F and/or strengthen the PHA material 108F more quickly than pulling the PHA material 108F through warmer temperatures. However, the water bath 114 may include water at warmer temperatures (e.g., temperatures indicated for the first chamber 115 of the water bath 114) throughout and the PHA material 108E/108F may be pulled through the water bath 114 more slowly to allow for the PHA material 108F to strengthen. A second temperature control system H2 may be provided to maintain the desired temperature of the water in the second chamber 117. For example, the second temperature control system H2 may be a heater/cooler system, as the desired temperature of the water in the second chamber 117 may be above or below room temperature.

Crystallization of the PHA material 108E may be expedited in the warmer chamber 115 of the water bath 114, so the second chamber 117 of the water bath 114 may make the PHA material 108F colder to make the PHA material 108F firmer for additional processing. The PHA material 108E/108F may be in each of the chambers 115, 117, respectively, for a period of time within a range of about one to three seconds. For example, the PHA material 108E may be in the first chamber 115 of the water bath 114 for a period of time within a range of about 1.5 to 2 seconds, or for about 1.8 to 2 seconds. In an example process, the first chamber 115 of the water bath 114 may be about 10 feet long, and the second chamber 117 of the water bath 114 may be about 10 feet long. The PHA material 108E/108F may be processed at a speed of about 330 feet per minute, such that the PHA material 108E/108F may be in each of the chambers 115, 117 of the water bath 114 for about 1.8 seconds.

The wall 119 may include a gasket 121 through which the PHA material 108E may be pulled into the second chamber 117 by the puller 116. The cooled PHA material 108G may not be fully hardened once it is received at the puller 116, as PHA material may harden more slowly than other materials that may be used for straws, such as polypropylene, for example. Accordingly, the two-stage water bath 114 may be longer than typical single-stage water baths used for making straws out of other material in order to allow for the PHA material 108E/108F to have more time in the water bath 114 to strengthen. For example, the water bath 114 may be between 20 and 30 feet in length. In an example, the water bath 114 may be 20 to 22 feet long.

As shown in FIG. 1, a water removal system 150 may be provided to remove excess water that may remain on the PHA material 108G after the PHA material 108G is pulled out of the two-stage water bath 114. FIG. 5A depicts an example water removal system 150 for use in manufacturing PHA drink straws in accordance with the methods disclosed herein.

As shown in FIG. 5A, the second chamber 117 of the two-stage water bath 114 may be fitted with a gasket 129 through which the PHA material 108G may be pulled. The gasket 129 may be made of a rubber material, and may have an inner diameter that corresponds to the diameter of the PHA material 108G. Thus, the gasket 129 may function to remove excess water from the outer surface of the PHA material 108G as it is pulled through the gasket 129.

The water removal system 150 may include one or more air rings 152. Each of the air rings 152 may be fed by a respective incoming compressed air line 154. Regulators (not shown) may be attached to the compressed air lines 154 to control the air pressure that is delivered to the air rings 152. The air pressure may be in a range of about 40 to about 60 psi. As the PHA material 108G is pulled through the air rings, the compressed air is delivered to the PHA material 108G. The compressed air may function to blow away excess water from the surface of the PHA material 108G.

FIG. 5B provides a detailed view of an air ring 152. As shown, the air ring 152 may have a cover portion 155 and a guide portion 151. As the PHA material 108G is pulled through the guide portion of the air ring 152, compressed air may delivered to the PHA material 108G in an inner region 153 defined by the air ring 152. The compressed air may be delivered to the PHA material 108G via a plurality of air discharge ports 157 defined by the air ring 152. A pulley 156 may be provided to aide movement of the PHA material 108H out of the water removal system 150 and into the puller 116.

As described above, the puller 116 may be configured to pull the PHA material 108E/108F through the two-stage water bath 114. As shown in FIG. 1, the puller 116 may include one or more foam belts 127. Each of the belts 127 may be driven by a respective pair of rollers 125. One belt 127 may be driven to rotate in a clockwise direction, while the other belt 127 may be driven to rotate in a counterclockwise direction. The belts 127 may cooperate to grip the PHA material 108H as it passes through the puller 116. Thus, the puller 116 may be configured to pull the PHA material in its various stages from the output of the die 106, through the two-stage water bath 114, and into the puller 116. And, thus, the puller 116 may also be configured to push the PHA material 108H through to a cutter 120.

The belts 117 may be made entirely or partially of a rubber material, such as an all-natural gum rubber, for example. The material of which the belts 117 are made may have a durometer of 30-55, preferably 45. In a typical system for manufacturing polypropylene straws, the material of which the puller belts are made may have a durometer of more than 90. It has been discovered that, as the stream of PHA material 108H is pulled through the puller 116, grooves form in the belts. The grooves correspond to the diameter of the PHA material 108H. After the grooves form, the belts are even better able to grip the material 108H than they are before the grooves form.

Figure 6:
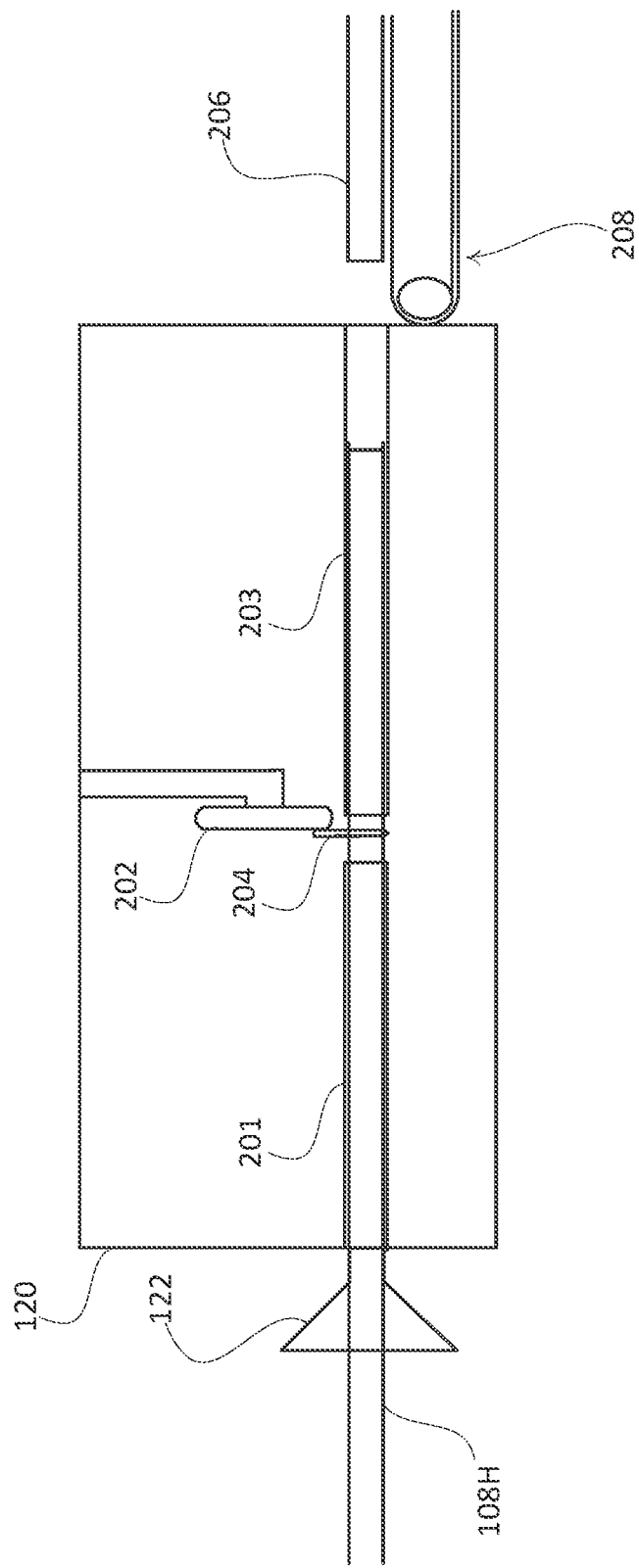
FIG. 6 depicts an example cutter for use in manufacturing PHA drink straws in accordance with the methods disclosed herein.

FIG. 6 depicts an example cutter for use in manufacturing PHA drink straws in accordance with the methods disclosed herein. The cutter 120 may be configured to cut the PHA material 108H at regular intervals to produce PHA straws 206 having a desired straw length. As shown in FIG. 6, the cutter 120 may receive the PHA material 108H and feed the PHA material 108H toward a flywheel 202. The PHA material 108H may be fed toward the flywheel 202 via an entrance tube 201. The flywheel 202 may be a sixteen-inch flywheel. The flywheel 202 may include one or more cutting blades 204 for cutting the PHA material 108H to the desired straw length. The cutting blades 204 may cut the PHA material 108H between the entrance tube 201 and an exit tube 203. The inner diameters of the entrance tube 201 and the exit tube 203 may correspond to the outer diameter of the PHA material 108H. That is, the cutting tubes may have inner diameters that correspond to the outer diameter of the straw being manufactured. The cutting tubes 201 and 203 may have inner diameters that are about 40% bigger than the desired outer diameter of the straw. For example, if the desired outer diameter of the finished straw product is about 286 mils, the inner diameters of the cutting tubes 201 and 203 may be about 396 mils.

The cutter 120 may receive the PHA material 108H through a funnel 122 or other funnel-shaped object. The diameter of the funnel 122 at the end closer to a cutting blade 204 of the cutter 120 may correspond to the outer diameter of the straw being produced. The PHA material 108H may be fed through the funnel 122 toward the cutting blade 204 for being cut to the appropriate length. The funnel 122 may be increased at the end toward the cutting blade 204 by about twenty-five thousandths of an inch when processing the PHA material 108H, as compared to when the system is processing other stronger material, such as polypropylene material. The increase in size may compensate for the PHA material 108H being less firm at this stage of the process and in order to feed more easily through the funnel 122. The PHA material 108H may be fed to the cutting blade for being cut to a desired length.

After the PHA material 108D is cut, a resulting straw 206 of the desired length may be discharged through the exit tube 203 and onto a conveyor belt 208.

In some situations, the finished straws 206 may not be completely dry even after they have been cut to length. Accordingly, an apparatus for making PHA straws may include an end-of-line air drying system. With reference once again to FIG. 1, the end-of-line air drying system may include one or more hot-air chambers 132, and a drying oven 134. Each of the one or more hot-air chambers 132 may include a respective electric hot-air fan 133. Each of the one or more hot-air fans 133 may be driven by a respective blow motor (not shown). The one or more hot-air chambers 132 may be coupled onto the conveyor system such that the fans 133 are situated over the conveyor belt 208. Thus, as the finished straws 206 are carried along on the conveyor belt 208, hot air generated by the fans 133 will dry the straws 206 as they pass through the hot-air chambers 133. The temperature of the hot-air fans may be set at about 500 F. The conveyor belt 208 may carry the straws 206 into a drying oven 134 for a final drying before the finished straws are deposited into an accumulation bin 136. The temperature of the drying oven may be set at about 190 F. The finished straws 206 may then be removed from the accumulation bin 136 to be wrapped and bagged.

A vision system 140 may be provided to monitor certain characteristics of the PHA material 108H just before it is pulled into the puller 116. For example, a vision system 140 may be provided to monitor the diameter and material thickness of the PHA material 108H.

Figure 7:
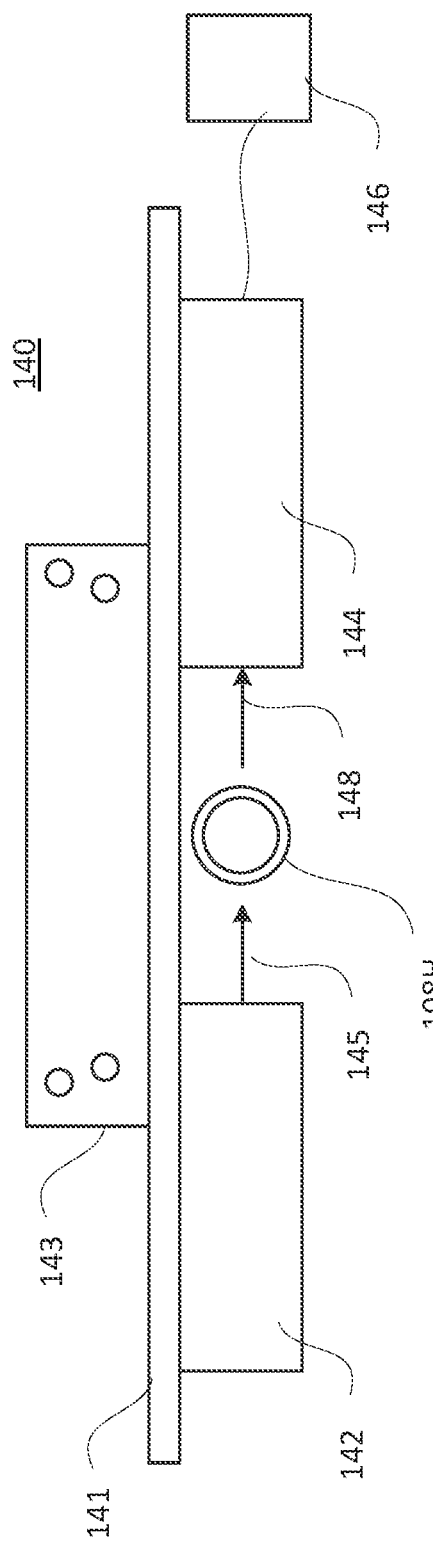
FIG. 7 depicts an example vision system for use in manufacturing PHA drink straws in accordance with the methods disclosed herein.

FIG. 7 depicts an example vision system 140 for use in manufacturing PHA drink straws in accordance with the methods disclosed herein. As shown, the vision system 140 may include a light projector 142, and a camera 144. The light projector 142 may project light 145 onto the PHA material 108H as it is being pulled into the puller 116 (not shown in FIG. 7). The camera 144 may receive light 148 that has passed through or around the PHA material 108H. A vertical mounting bracket 143 and a horizontal mounting bracket 141 may be provided for mounting the vision system 140.

The camera 144 may be electrically coupled to an analyzer 146, which may be a computer processor. The analyzer 146 determines from the spatial pattern of the received light 148 whether the diameter of the PHA material is within acceptable tolerances at this stage of the process. The spatial pattern of the received light will be affected by the PHA material 108H blocking some of the emitted light 145 that is incident on it. The analyzer 146 determines from the intensity of the received light 148 whether the material thickness of the PHA material 108H is within acceptable tolerances at this stage of the process. The intensity of the received light will be affected by the PHA material 108H blocking some of the emitted light 145 that is incident on it. If the analyzer 146 determines that either the diameter or the material thickness is outside of acceptable tolerances, the analyzer may provide an alarm sound or message to indicate that corrective action needs to be taken at some point along the system.

Figure 8C:
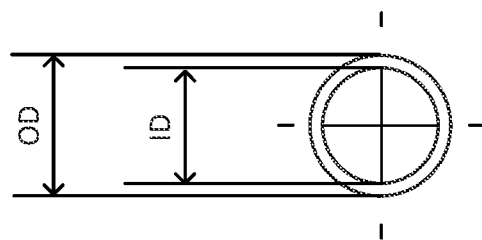
FIG. 8C is a cross-sectional view of the drink straw depicted in FIG. 8A.
Figure 8B:
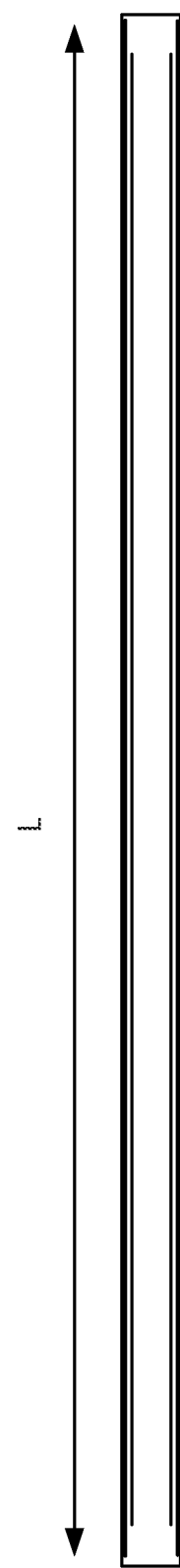
FIG. 8B is a side plan view of the drink straw depicted in FIG. 8A.
Figure 8A:
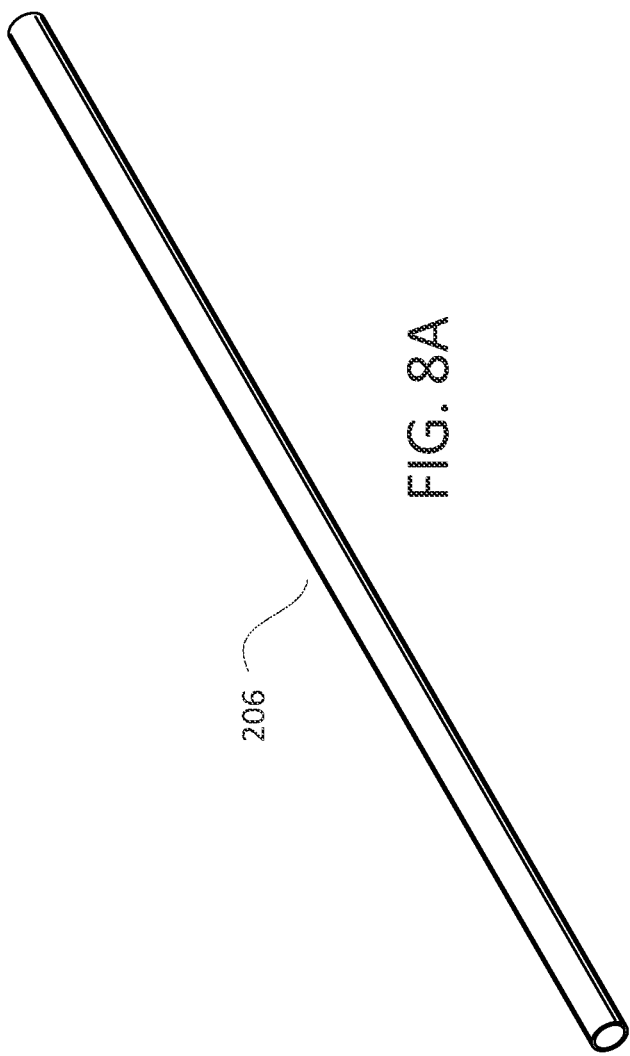
FIG. 8A depicts an example drink straw.

It should be understood that PHA straws produced according to the systems and methods described herein may have various lengths, diameters, and material thicknesses. FIG. 8A depicts an example drink straw 206, which may be made of a PHA material. FIG. 8B is a side plan view of the drink straw 206 depicted in FIG. 8A. FIG. 8C is a cross-sectional view of the drink straw 206 depicted in FIG. 8A. As shown, the straw 206 may have a tubular body. The tubular body may define a hollow tube. The tubular body of the straw 206 may have a length, L, an inner diameter, ID, and an outer diameter, OD. The material thickness of the straw 206, that is, the thickness of the walls of the tubular body of the straw, may be a function of the inner diameter ID and the outer diameter OD. Specifically, the material thickness of the straw 206 may be half the difference between the outer diameter OD and the inner diameter ID.

The length of the straw 206 may range from about five inches to about 10.5 inches. The material thickness of the straw 206 may range from about five mils to about ten mils, preferably between six mils and seven mils, and typically around eight mils. In an example, a drink straw 206 may have a length of about 7.75 inches, an inner diameter of about 207 mils, an outer diameter of about 219 mils, and a material thickness of about six mils. In another example, a drink straw 206 may have a length of about 10.25 inches, an inner diameter of about 270 mils, an outer diameter of about 284 mils, and a material thickness of about seven mils. In yet another example, a drink straw 206 may have a length of about 8.50 inches, an inner diameter of about 270 mils, an outer diameter of about 284 mils, and a material thickness of about seven mils. In an example that may be suitable for use as a drink stirrer, a drink straw 206 may have a length of about 5.00 inches, an inner diameter of about 103 mils, an outer diameter of about 115 mils, and a material thickness of about six mils.

It should also be understood that PHA straws produced according to the systems and methods described herein may have useful features in addition to a basic hollow tubular body. For example, a PHA straw produced according to the systems and methods described herein may have a flexible neck portion. In another example, a PHA straw produced according to the systems and methods described herein may have a spiked end portion. Such a straw may be useful in connection with well-known juice boxes.

Figure 9C:
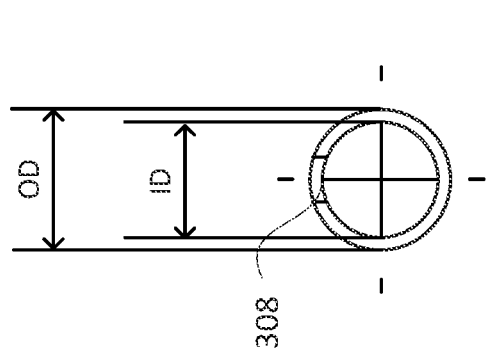
FIG. 9C is a cross-sectional view of the drink straw depicted in FIG. 9A.
Figure 9A:
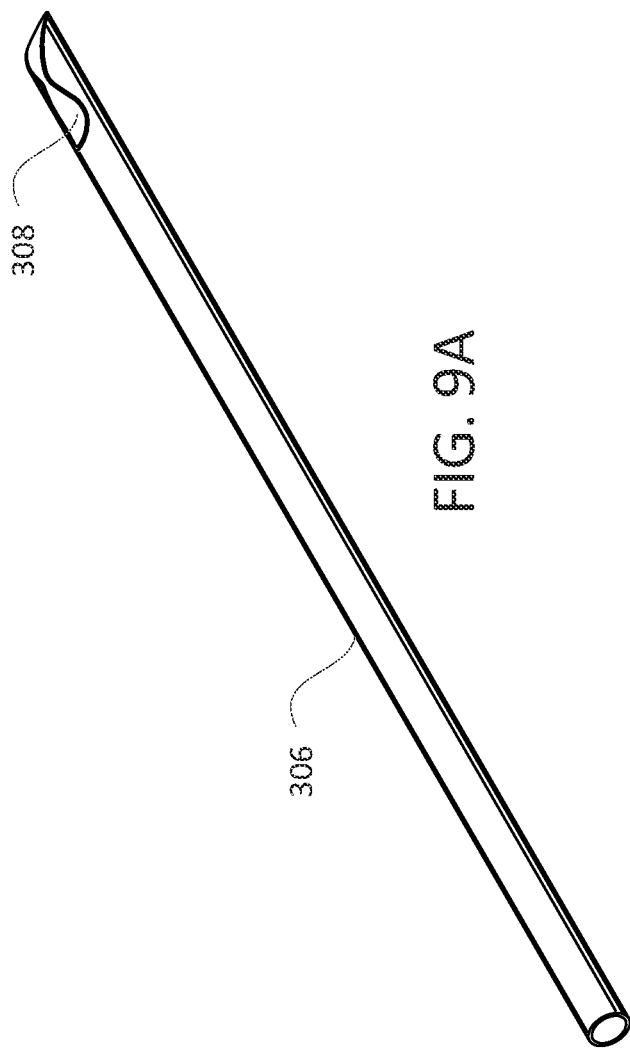
FIG. 9A depicts an example drink straw having a shovel end portion.
Figure 9B:
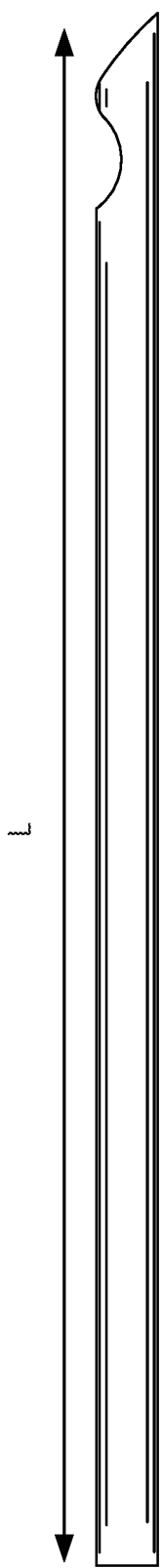
FIG. 9B is a side plan view of the drink straw depicted in FIG. 9A.

In yet another example, a PHA straw produced according to the systems and methods described herein may have a shovel-shaped end portion. Such a straw may be useful in connection with consuming frozen beverages, such a milkshakes, for example. FIG. 9A depicts an example drink straw 306, which may be made of a PHA material. FIG. 9B is a side plan view of the drink straw 306 depicted in FIG. 9A. FIG. 9C is a cross-sectional view of the drink straw 306 depicted in FIG. 9A. As shown, the straw 306 may have a tubular body and a shovel-shaped end portion 308. As described above, the tubular body may define a hollow tube having a length, L, an inner diameter, ID, and an outer diameter, OD.

Although features and elements are described herein in particular combinations, each feature or element can be used alone or in any combination with the other features and elements.

What is claimed is:

1. An apparatus for manufacturing a drink straw, the drink straw having an outer diameter and a wall thickness, the apparatus comprising:
   an extruder die that is configured to receive molten polyhydroxyalkanoate (PHA) material from an extruder and to produce a stream of extruded PHA material that has a tubular shape; and
   a pre-sizing water bath that is configured to receive the stream of extruded PHA material directly from the extruder die, and to provide the stream of extruded PHA material via a sizing tube to a second water bath,
   wherein the sizing tube extends a distance into the second water bath and is configured to control the outer diameter and wall thickness of the drink straw, and
   wherein the pre-sizing water bath is a non-vacuum container having an open top.

2. The apparatus of claim 1, wherein the raw PHA material is made of a material comprising at least 50% PHA.

3. The apparatus of claim 1, wherein the stream of extruded PHA material has an outer diameter, and the sizing tube has an inner diameter that is larger than the outer diameter of the stream of PHA material.

4. The apparatus of claim 3, wherein the sizing tube has an inner diameter that is about 40% larger than the outer diameter of the stream of extruded PHA material.

5. The apparatus of claim 1, wherein the sizing tube defines a plurality of holes extending through an outer surface thereof.

6. The apparatus of claim 1, wherein the pre-sizing water bath has a length of four to five inches in a direction along which the stream of extruded PHA material is being provided from the extruder die to the sizing tube.

7. The apparatus of claim 1, wherein the pre-sizing water bath has a length of at least four inches in a direction along which the stream of extruded PHA material is being provided from the extruder die to the sizing tube.

8. The apparatus of claim 1, wherein the pre-sizing water bath contains water that is at a temperature of greater than 125° F.

9. The apparatus of claim 1, wherein the pre-sizing water bath contains water that is at a temperature that is within a range of 125° F. to 150° F.

10. The apparatus of claim 1, wherein the pre-sizing water bath contains water that is at a temperature that is within a range of 60° F. to 135° F.

11. The apparatus of claim 10, wherein the extruded PHA material is extruded from an end of the extruder having a temperature within a range of 340° F. to 390° F.

12. The apparatus of claim 1, wherein the pre-sizing water bath contains water that is at a temperature that is at least 200° F. cooler than the temperature of the extruded PHA material that is received by the pre-sizing water bath.

13. The apparatus of claim 12, wherein the temperature of the water contained by the pre-sizing water bath is within a range of 60° F. to 135° F.

14. The apparatus of claim 13, wherein the difference between the temperature of the water contained by the pre-sizing water bath and the temperature of the extruded PHA material received by the pre-sizing water bath shocks the extruded PHA material into beginning a crystallization process.

15. The apparatus of claim 1, wherein the extruded PHA material is at a first temperature, the pre-sizing water bath contains water that is at a second temperature, and the difference between the first temperature and second the temperature shocks the extruded PHA material into beginning a crystallization process.

16. The apparatus of claim 1, wherein the raw PHA material is made of a material comprising at least 80% PHA.

* * * * *